United States Patent [19]
Tao et al.

[11] Patent Number: 6,064,168
[45] Date of Patent: May 16, 2000

[54] METHOD OF CONTROLLING ROBOT MOVEMENT

[75] Inventors: Jianming Tao, Rochester Hills; Jason Tsai, Bloomfield Hills; H. Dean McGee, Rochester Hills, all of Mich.

[73] Assignee: FANUC Robotics North America, Inc., Rochester Hills, Mich.

[21] Appl. No.: 09/039,095

[22] Filed: Mar. 13, 1998

[51] Int. Cl.[7] .............................. B23K 9/12; B25J 15/02; G05B 19/33

[52] U.S. Cl. .............................. 318/568.21; 318/568.22; 318/576; 219/125.12; 219/124.33; 901/29; 901/42

[58] Field of Search .................... 219/124.22, 124.33, 219/121.11, 125.12; 395/80, 85; 901/2, 41–43, 30, 29; 318/568.2, 568.21, 568.22, 569–576, 592–594, 568.17, 568.1, 567, 568.11; 700/159, 160, 162

[56] References Cited

U.S. PATENT DOCUMENTS

| | | |
|---|---|---|
| 4,150,329 | 4/1979 | Dahlstrom . |
| 4,260,870 | 4/1981 | Sekino et al. . |
| 4,362,977 | 12/1982 | Evans et al. .............................. 395/89 |
| 4,488,242 | 12/1984 | Tabata et al. .............................. 395/94 |
| 4,621,333 | 11/1986 | Watanabe . |
| 4,633,059 | 12/1986 | Sarugaku et al. . |
| 4,677,276 | 6/1987 | Nio et al. . |
| 4,689,469 | 8/1987 | Detriche et al. .................... 219/125.12 |
| 4,791,270 | 12/1988 | Nelson, Jr. et al. . |
| 4,831,235 | 5/1989 | Kishi et al. .......................... 219/125.12 |
| 4,835,710 | 5/1989 | Schnelle et al. . |
| 5,023,533 | 6/1991 | Ishikawa et al. .......................... 395/95 |
| 5,063,281 | 11/1991 | Mizuno et al. . |
| 5,130,515 | 7/1992 | Toyoda et al. . |
| 5,171,966 | 12/1992 | Fukuoka et al. ..................... 219/125.12 |
| 5,254,923 | 10/1993 | Kanitani .............................. 318/568.11 |
| 5,303,333 | 4/1994 | Hoos .......................................... 395/80 |
| 5,315,222 | 5/1994 | Kasagami et al. ................. 318/568.11 |
| 5,572,103 | 11/1996 | Terada . |
| 5,582,750 | 12/1996 | Hamura et al. . |
| 5,620,619 | 4/1997 | Jong-Hee et al. . |

*Primary Examiner*—Brian Sircus
*Attorney, Agent, or Firm*—Howard & Howard

[57] ABSTRACT

A method of controlling movement of a robot includes moving only the wrist portion about two of the wrist axes to achieve a repeated and cyclical movement, such as a back-and-forth movement of the tool relative to a preselected path. Since only the wrist is moved, the range of available tool positions can be determined. In most instances, the desired position of the tool as it deviates from the path is outside of the range of available tool positions, given that only the wrist will move. The method of this invention includes determining a target position within the range of available positions that best corresponds to the desired position of the tool. A unique inverse kinematics solution, which includes fixing one of the wrist axes, is used to determine the wrist orientation required to place the tool into the target position.

29 Claims, 2 Drawing Sheets

METHOD OF CONTROLLING ROBOT MOVEMENT

BACKGROUND OF THE INVENTION

This invention generally relates to a method of controlling movement of a robot. More particularly, this invention relates to a method of controlling the movement of a tool supported on a robot wrist by moving only the robot wrist.

The industrial use of robots has been a growing industry for a number of years. Robots are being used for a larger variety of applications than ever before. Each new application for a robot presents special challenges and difficulties that must be overcome to provide efficient operation while performing the desired task.

One example application that is particularly challenging is where a robot must repeatedly move in a back-and-forth pattern to perform a desired operation. One example operation that requires such motion is known as a weaving-like motion, which is typically used during a welding process. Several attempts have been made at developing a methodology for controlling a robot to perform a weaving-like welding operation.

One example of a proposed solution is found in U.S. Pat. No. 4,150,329. The disclosure of that patent suggests a technique for tracing a 3-dimensional weaving-like pattern that is defined by relative amounts of movement along three perpendicular reference axes. A major shortcoming of that proposal, however, is that when a principal welding line is not in a specific orientation relative to one of the reference axes, the weaving-like pattern becomes abnormal and unsatisfactory results are achieved.

Another example proposed solution is found in U.S. Pat. No. 4,621,333. While the arrangement of that patent may represent an improvement over the previously mentioned patent, it does not provide a workable solution in many instances. One drawback associated with the latter patent is that it requires teaching a plurality of welding points to the robot that later will be followed during operation. Such teaching operations can be undesirably complex, time-consuming and, moreover, may not be as accurate as required in many instances.

A major shortcoming of all prior attempts is that they require moving a substantial portion of the entire robot arm to achieve the weaving-like pattern. In many applications, high frequency motion is desired and in some it is required. When a substantial portion of the robot arm must move to achieve the desired weaving pattern, large amounts of inertia must be compensated for because of the mass of the portions of the robot involved in the desired motion. In many instances, the inertia cannot be compensated for in a satisfactory manner. Therefore, the frequency of a back-and-forth motion is typically limited below desirable levels.

This invention overcomes the shortcomings and drawbacks of the prior art by providing a method for controlling the movement of a robot by only moving the robot wrist to obtain the necessary back-and-forth motion. With this invention, much higher frequencies can be obtained and most of the prior art difficulties in compensating for inertia and robot vibration are eliminated. Further, this invention provides a more easily implemented solution that is useful for a variety of applications while providing greater accuracy.

SUMMARY OF THE INVENTION

In general terms, this invention is a method for controlling movement of a tool that is supported by a robot having a wrist that is moveable about a plurality of wrist axes that are associated with a wrist origin. The method includes several basic steps. First, the tool is positioned adjacent a preselected tool path by moving the robot arm into an appropriate orientation. The wrist origin is then moved along a wrist path that corresponds to the preselected tool path. While the wrist origin is moving along the wrist path, the robot wrist moves so that the tool is moved in a first direction away from the preselected tool path. Importantly, only the robot wrist moves about at least one of the wrist axes to move the tool away from the path. After the tool has reached a desired distance from the preselected path, it is then moved in a second direction back toward the path by moving only the robot wrist. The movement of the tool toward and away from the path is cyclically repeated while the wrist origin moves along the wrist path. In this manner, the method of this invention achieves a weaving-like motion of a tool, such as a welding torch by moving only the robot wrist.

The various features and advantages of this invention will become apparent to those skilled in the art from the following detailed description of the presently preferred embodiment. The drawings that accompany the detailed description can be briefly described as follows.

DETAILED DESCRIPTION OF THE PREFERRED EMBODIMENT

Figure 1:
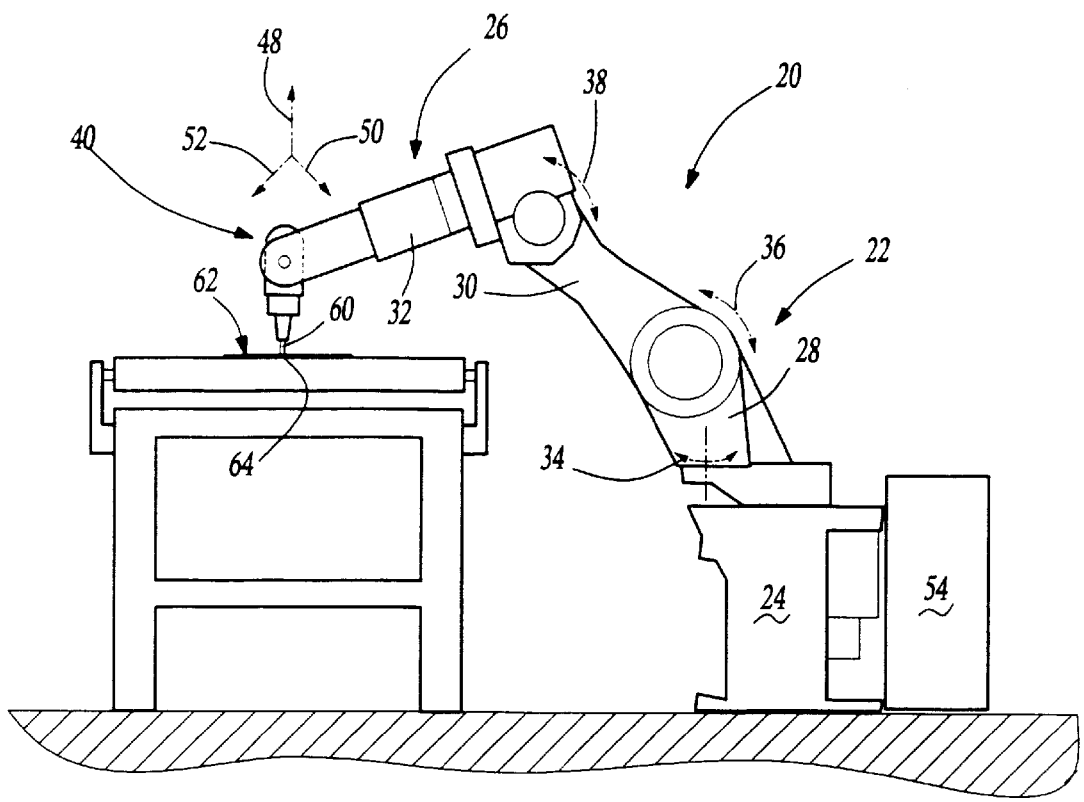
FIG. 1 is a diagrammatic illustration of a robot system designed according to this invention.

FIG. 1 diagrammatically illustrates a robot system 20. An industrial robot 22 includes a base 24 and a robot arm 26 supported on the base 24. The robot arm 26 includes a plurality of arm portions 28, 30 and 32. The robot arm 26 is moveable into a plurality of orientations by moving the arm portions about a plurality of arm axes. In the illustrated example, the arm portion 28 is rotatable relative to the base 24 as indicated by the arrow 34. The arm portions 28 and 30 can be pivoted or flexed relative to each other as indicated by the arrows 36. Similarly, the arm portions 30 and 32 can be pivoted or flexed relative to each other as indicated by the arrows 38. The arrows 34, 36 and 38 are representative of three arm axes about which the robot arm is moveable.

At one end of the robot arm 26, a robot wrist 40 is supported. The illustration does not show details of the wrist components. The wrist preferably includes moveable components that are all moveable about three axes 48, 50 and 52, respectively. For purposes of illustration, a three-axis wrist will be discussed throughout this specification, however, this invention is not limited to an arrangement having such a robot wrist. Further, for simplification, an in-line wrist will be discussed, which includes three perpendicular axes that intersect each other at a common origin point 46. Off-center wrist axis arrangements are also workable with the method of this invention.

A tool 60 is supported on the robot wrist 40. For purposes of illustration, the tool 60 will be considered to be a welding torch. The motion that the robot 22 is to perform will be discussed as a weaving welding motion although the invention is not limited to such applications. The method of this invention, as will become apparent below, is useful for all robot applications where a wrist-only motion is useful or necessary. Example applications include those where repeated and cyclical tool movement is required. Moving only the wrist 40 provides the needed movement while avoiding concerns with robot arm inertia, etc.

A controller 54 controls conventional actuators (not illustrated) for moving the robot arm 26 and the robot wrist 40 into a plurality of positions/orientations, respectively. The controller 54 can be any commercially available robot controller including appropriate software designed to meet the needs of a particular situation.

FIG. 1 also diagrammatically illustrates a part or workpiece 62 upon which the robot 22 is to perform the desired operation. A welding seam 64 defines a path for the tool 60 to follow during a welding operation.

Referring now to FIGS. 2a, 2b, 3a and 3b, the tool 60 is positioned adjacent the tool path 64 by moving the robot arm 26 into an appropriate orientation. The path 64 preferably is a preprogrammed path that is stored in the controller 54. The controller 54 determines a wrist path 65 (see FIG. 2a) that the wrist origin 46 follows. The wrist path 65 corresponds to the tool path 64.

The wrist path 65 preferably is determined by first defining a starting position for the tool 60. At the starting position, a solution for moving the tool center point along the tool path 64 is provided. The wrist path 65 is then determined from the solution for the tool center point. Although the wrist path 65 is illustrated as being generally parallel to the preselected tool path 64, it is possible to have the wrist path 65 vary in configuration relative to the preselected tool path 64 if a particular situation requires such an arrangement. Further, depending on the needs of a particular situation, the entire wrist path 65 can be predetermined or the wrist path 65 can be dynamically determined throughout the robot operation at selected update intervals.

As will become apparent from the remainder of this description, the movement of the wrist origin 46 along the wrist path 65 is performed simultaneous with moving the wrist 40 about the wrist axes. The wrist origin 46 moves along the path 65 typically by moving the robot arm 26. It is also possible to move the wrist origin 46 along the path 65 by moving the part 62, on a conveyor for example, relative to the robot arm 26.

Figure 2A:
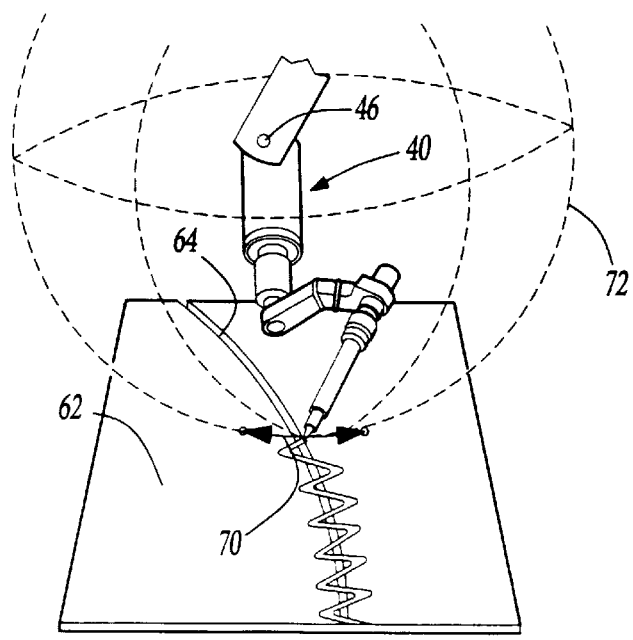
FIG. 2a is a diagrammatic illustration of a repeated motion pattern achieved by implementing the method of this invention.
Figure 2B:
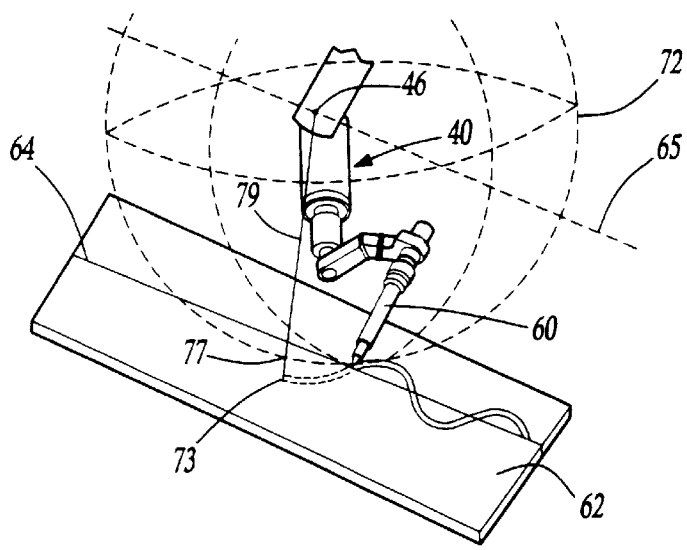
FIG. 2b shows the embodiment of FIG. 2a from a different perspective to highlight selected features of this invention.

As the wrist origin 46 moves along the path 65, the robot wrist 40 moves the tool in a first direction 66 away from the path 64. The tool 60 is then moved back toward the path until it is positioned adjacent and directly above (according to the drawing) or aligned with the path 64. As the wrist origin 46 progresses along the path 65, the tool 60 then moved in an opposite direction away from the path 64 as indicated by the arrow 68. Subsequently, the tool 60 is moved back directly in line with the path 64. The back-and-forth motion of the tool 60 is accomplished by moving only the robot wrist 40 about at least one of the wrist axes 48, 50 and/or 52. This back-and-forth motion preferably is achieved by moving the tool 60 in an arcuate pattern as schematically illustrated at 70. The resulting welding pattern is shown in FIG. 2a.

While a sinusoidal weaving pattern is illustrated, this invention is not limited to such applications. Other example robot operations that can be performed using this invention include dwell delay patterns. In general, two dwell delay patterns are used. A stop dwell delay includes keeping the tool 60 stationary in a position away from the path 64 for a specified delay time. A move dwell delay causes the robot 22 to cease lateral motion but continued forward motion (i.e., along the path 64) while the tool 60 is at a specified distance from the path 64.

Moreover, the phrase "back and forth motion" exemplifies only one application of the method of this invention. As will become apparent below, this invention is useful for any robot application where moving only the wrist will accomplish an intended result.

The path 64 preferably is preprogrammed into the controller 54. The movement of the tool away from the path 64 preferably is set by a user who enters information regarding the desired magnitude of deviation 66, 68, the desired frequency and acceptable tolerances, for example. The controller 54 processes such information to generate the back-and-forth weaving motion.

The in-line example given in this specification simplifies the determination of the direction of movement 70. An in-line wrist typically supports a tool in a manner giving the tool an approach vector that is aligned with the tool during an operation. In the preferred embodiment, the motion 70 is taken along the sphere 72 in a direction that is perpendicular to the approach vector of the tool 60. In a wrist weaving application, the approach vector preferably is aligned with the tangent direction of the wrist motion sphere. The motion 70 preferably is perpendicular to a reference plane, which is defined by the intersection of two lines and the welding torch 60 body. The first line passes through the center of the face plate of the wrist 40 and extends perpendicular from the face plate. The second line is parallel to the body of the welding torch 60 and passes through the tool center point.

Since only the robot wrist 40 moves to cause the tool 60 to deviate from the path 64, the range of possible tool positions can be determined at any given moment. Since the controller 54 knows the location of the origin 46 of the wrist axes at any given moment, given the dimensions of the wrist components and the relationship between the tool 60 and the wrist 40, the controller 54 determines a range of possible tool positions. In the illustrated example, the wrist 40 is an in-line wrist having three axes that intersect at a common origin 46 that defines a center point of a sphere 72. The sphere 72 is the range of possible tool positions. As can be appreciated from FIG. 2, the back-and-forth motion 70 results from moving the tool 60 along a portion of the sphere 72. By repeatedly moving the tool from right-to-left (according to the drawings), the desired weaving motion is achieved.

In most instances, as the tool 60 moves away from the path 64, the distance between the tool and the surface of the workpiece 62 will increase. This can be appreciated, for example, in FIG. 3b as the tool 60 moves from the center position to other positions along the sphere 72, the distance 67 between the lower (according to the drawing) end of the tool and the surface of the part 62 increases. The distance between the end of the tool 60 and the surface of the part must be kept within certain limits to achieve an accurate and complete welding operation. Accordingly, the method of this invention includes determining which point on the sphere 72 (i.e., which tool position within the range of available tool positions based upon only moving the wrist) will work best at any given moment.

Figure 4:
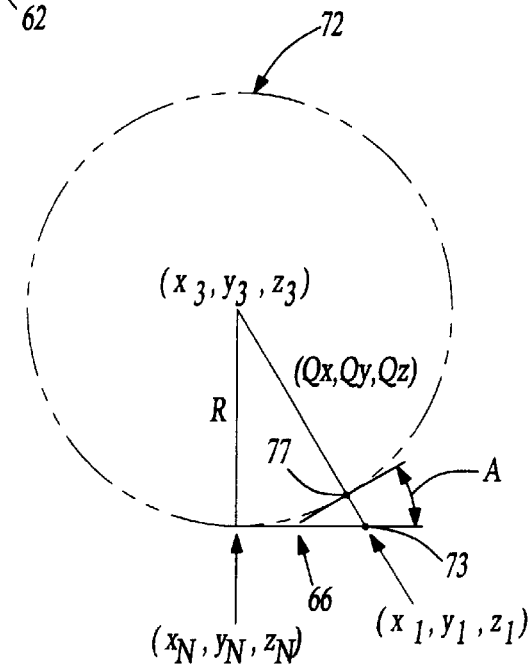
FIG. 4 schematically illustrates a feature of the method of this invention.
Figure 3B:
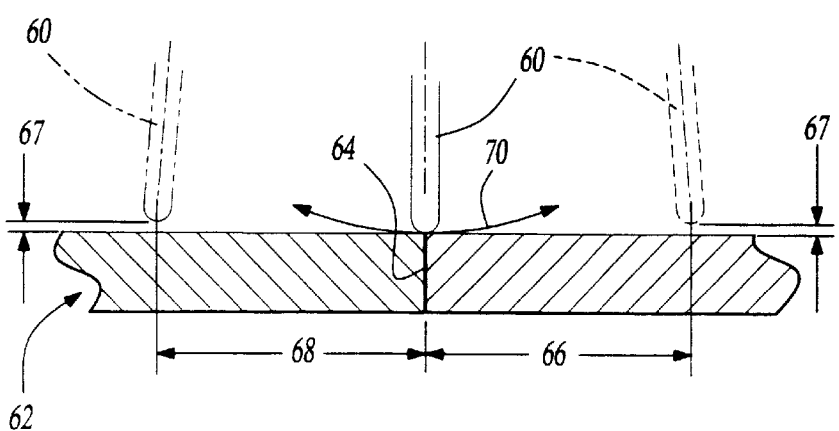

FIG. 4 schematically illustrates, in two-dimensions, how the method of this invention utilizes a minimum distance solution to determine the position that the tool 60 is moved into during a weaving-like motion. The origin 46 is shown at $(X_3, Y_3, Z_3)$. The end of the tool 60 is at the point $(X_N, Y_N, Z_N)$ when the tool 60 is aligned with the path 64. A point 73 $(X_1, Y_1, Z_1)$ on the part 62 is the desired position of the tool 60 away from the path 64. The distance between the path 64 and the point 73 $(X_1, Y_1, Z_1)$ is indicated at 66. The angle "A" is the angle between the tangent to the sphere 72 at the point 77 $(Q_x, Q_y, Q_z)$ and a vector from the point $(X_n, Y_n, Z_n)$ through $(X_1, Y_1, Z_1)$. Since only the wrist 40 will be moved, the tool 60 cannot exactly reach the desired point 73. This is indicated by the spacing between the point $(X_1, Y_1, Z_1)$ and the sphere 72, which defines the available range of tool positions. This invention includes determining the point on the sphere 72 that best corresponds to the desired point and then moving only the wrist 40 to place the tool 60 into the appropriate position. In the illustrated example, the point 77 $(Q_x, Q_y, Q_z)$ is that point determined to best correspond to the desired point. Once $(Q_x, Q_y, Q_z)$ is determined, inverse kinematics preferably are utilized (as described below) to determine the necessary wrist angles (i.e., the positions of the wrist components about the wrist axes) to place the end of the tool 60 into the desired position.

In the preferred embodiment, $(Q_x, Q_y, Q_z)$ is determined to be the point 77 on the sphere 72 having a minimum distance from the desired point 73 $(X_1, Y_1, Z_1)$. In other words, the preferred embodiment includes minimizing the amount of distance between the actual position of the end of the tool 60 and the desired position. The minimum distance solution is only one example of the possible solutions that work with this invention.

The desired point preferably is not preprogrammed as a target point. Instead, the magnitude of the deviation (i.e., 66 or 68) of the tool 60 from the nominal path 64 preferably is programmed into the controller 54. The distance between the point $(X_1, Y_1, Z_1)$ and the path 64 preferably provides the criteria that the controller 54 utilizes to determine where to move the tool 60 when it is being directed away from the path 64.

In FIG. 4, the desired position of the tool 60 is the point $(X_1, Y_1, Z_1)$. The minimum distance solution results in the point $(Q_x, Q_y, Q_z)$. From the geometric relationships of FIG. 4, the following equations are true:

$$(X_3-X_1)^2+(Y_3-Y_1)^2+(Z_3-Z_1)^2=R_1^2;$$

$$(X_3-Q_x)^2+(Y_3-Q_y)^2+(Z_3-Q_z)^2=R^2;$$

$$(Q_x-X_1)/(X_3-X_1)=(Q_y-Y_1)/(Y_3-Y_1);$$

and $$(Q_x-X_1)/(X_3-X_1)=(Q_z-Z_1)/(Z_3-Z_1);$$

where $R_1$ is the distance from the point $(X_1, Y_1, Z_1)$ to the wrist origin 46 and R represents the radius of the exact solution sphere 72. It follows that the point Q $(Q_x, Q_y, Q_z)$ is given by the following three equations:

$$Q_x=X_3-(X_3-X_1)*(R/R_1);$$

$$Q_y=Y_3-(Y_3-Y_1)*(R/R_1);$$

and $$Q_z=Z_3-(Z_3-Z_1)*(R/R_1).$$

Given these equations, the wrist inverse kinematics solution is obtainable. It is important to note that a conversion from the above equations to a 3-dimensional (i.e., real world) solution including considering the dimensions of the tool 60 is required.

Referring back to FIG. 2b, the desired point 73 on the workpiece 62 is shown in three dimensions. The point 77 on the solution sphere 72 is the point $(Q_x, Q_y, Q_z)$ that is determined as described above. The inverse kinematics solution of this invention preferably includes determining a position vector 79 that extends from the wrist origin 46 to the next tool position 77. The vector 79 is determined based upon the determined location of the point 77 and the location of the wrist origin 46 corresponding to the time when it is desired for the tool 60 to be moved into the next tool position 77. This position of the wrist origin is referred to as the current wrist origin position in this specification. Once the position vector 79 is determined, inverse kinematic equations are then solved using the position vector information to determine the necessary wrist axes positions to move the tool 60 into the next tool position 77 without causing the wrist origin 46 to deviate from the wrist path 65.

The preferred embodiment of this invention includes fixing a value for one of the wrist axes positions. In other words, one of the angles of the wrist 40 preferably is fixed so that a set of inverse kinematic equations that solve for the two remaining wrist angles can be determined. The fixed angle value and the information regarding the position vector 79 are used with the two axis inverse kinematic equations to determine the necessary positions of the wrist 40 along the remaining two non-fixed axes that will place the tool 60 in the next tool position required to continue the weaving operation.

The tool 60 will have an operating point or end point that is spaced from the face plate (i.e., the furthest point of the robot wrist 40). The offset between the face plate of the wrist 40 and the end of the tool 60 can be determined in a conventional manner. Utilizing the conventional wrist notations to identify the three wrist axes angles as angles 4, 5 and 6, the following equations define the tool center point $(P_x, P_y, P_z)$:

$$P_x=(c4c5c6-s4s6)*T_x-(c4c5s6+s4c6)*T_y+c4s5*T_z+c4s5*d6;$$

$$P_y=(s4c5c6+c4s6)*T_x-(s4c5s6-c4c6)*T_y+s4s5*T_z+s4s5*d6;$$

and $$P_z=-s5c6*T_x+s5s6*T_y+c5*T_z+c5*d6;$$

where d6 is the wrist length from the wrist origin to the center of the face plate; $T_x$, $T_y$ and $T_z$ represent the coordinates of the tool center point relative to the wrist frame described by the wrist axes 48, 50 and 52 (FIG. 1), and the notation "c4" means cos(ang 4), for example.

The solution sphere 72 has an origin at 46 and a radius described by the equation:

$$R=\text{sqrt}(d6*d6+R_t*R_t+2*d6*T_z);$$

where $$R_t=\text{sqrt}(T_x*T_x+T_y*T_y+T_z*T_z)$$

For any given point on the sphere 72 (i.e., any point within the range of available tool positions), it is possible to have an infinite number of wrist axis angle combinations that will place the tool 60 into the determined position. The method of this invention preferably includes utilizing a minimal characteristic for determining the actual wrist axis angle positions to achieve a desired tool position. The criteria can be, for example, the movement of the wrist that will result in the minimum amount of change in angular position along any one or all three of the wrist axes. Another possible solution is to choose the wrist axes angles that will minimize the amount of change in the wrist orientation.

The preferred embodiment includes fixing one of the axes so that the wrist 40 moves only along two joints of the three axes. By fixing the angle along one of the axes, a unique solution exists for the position of the wrist components relative to the two remaining axes. Since there is a unique solution, the inverse kinematics determination is accomplished more quickly and readily since there is no decision to be made by the controller 54 regarding a plurality of possible wrist orientations.

Preferably, the angle 6 is fixed so that a unique wrist angle solution is obtained by solving for angles 4 and 5 through inverse kinematics. With angle 6 being fixed, it becomes possible to determine a set of equations that describe the tool center point in terms of angles 4 and 5 only. Such equations provide a unique solution for the wrist axis positions. Given this description, those skilled in the art can develop and solve the necessary equations through software.

The preferred method includes selecting angle 6 to not change during a given movement of the wrist 40. It is important to note that selecting angle 6 to be fixed does not require that angle 6 be fixed throughout an entire operation, but rather only that the angle 6 does not contribute to moving the wrist 40 into a new orientation during an operation such as a sinusoidal weaving welding pattern.

Figure 3A:
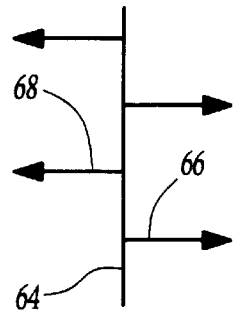
FIGS. 3a and 3b diagrammatically illustrates geometric considerations associated with the method of this invention.

Accordingly, a weaving welding operation using the method of this invention can be summarized as follows. The first step is to determine a desired amount of change in position of the tool from the predetermined tool path 64 by determining a magnitude and direction of change (66 or 68 as shown in FIG. 3A). Next, the desired tool location (i.e., the tool center point ($P_x$, $P_y$, $P_z$)) in the solution sphere 72 is determined using the minimum distance solution, for example. Then inverse kinematics are used to determine the required wrist angles to move the tool 60 into the desired position. The inverse kinematics preferably include fixing one of the wrist angles and determining the needed angles for the other two wrist axes to place the tool 60 into the desired position on the solution sphere 72.

In somewhat more general terms, the method of this invention can be summarized as a method of controlling movement of a tool that is supported by a robot 22 having a wrist 40 that is moveable about three wrist axes 48, 50 and 52 that are each associated with a wrist origin 46. The wrist origin 46 is moved along a predetermined wrist path 65. A desired tool position 73 is determined. A next tool position is determined from a set of tool positions available by moving only the wrist 40 about the wrist axes with the wrist origin 46 in a current wrist origin position. A position vector 79 is then determined between the current wrist origin position and the next tool position 77. A set of wrist axis angles or positions necessary to move the tool 60 into the next tool position is then determined from the position vector information and the determined next tool position. The tool 60 is then moved from a current tool position into the next tool position by moving only the wrist 40 into the determined set of wrist axes positions.

As the wrist origin 46 moves along the wrist path 65, preselected update intervals are either preprogrammed or determined dynamically and used to instigate determining the next desired tool position and the remaining steps summarized in the previous paragraph.

Of course, other solution methods utilizing different equations than those described above are possible and the stated solutions are examples of an implementation of this invention.

Given this description, those skilled in the art will be able to realize the software for programming the controller 54 in a manner that it performs the necessary calculations for moving the wrist 40 according to the method of this invention.

The foregoing description is exemplary rather than limiting in nature. Variations and modifications to the disclosed embodiment may become apparent to those skilled in the art that do not necessarily depart from the purview and spirit of this invention. Accordingly, the legal scope of protection is only limited by the following claims.

The following is claimed:

1. A method of controlling movement of a tool that is supported by a robot having a wrist that is moveable about a plurality of wrist axes that are associated with a wrist origin, comprising the steps of:

(A) positioning the tool adjacent a preselected tool path;

(B) moving the wrist origin along a predetermined wrist path corresponding to the preselected tool path;

(C) moving the tool in a first direction away from the preselected tool path by moving only the wrist about at least one of the wrist axes;

(D) moving the tool in a second direction back toward the preselected tool path by moving only the wrist about at least one of the wrist axes; and (E) cyclically performing steps (C) and (D) while performing step (B).

2. The method of claim 1, wherein the wrist is supported at one end of a robot arm and wherein step (A) is performed by moving the robot arm into an arm orientation and the wrist into a wrist orientation such that the tool is positioned adjacent the preselected tool path.

3. The method of claim 2, wherein step (B) is performed by moving the robot arm.

4. The method of claim 1, wherein the preselected path is defined on a part and wherein step (B) is performed by moving the part relative to the robot.

5. The method of claim 1, wherein step (C) is performed by determining a desired tool position that is spaced from the preselected path;

determining a range of available tool positions based upon only moving the wrist about the wrist axes;

determining a next tool position, from within the range of available tool positions, that corresponds to the desired tool position; and moving the tool to the next tool position by moving only the wrist while maintaining the wrist origin on the wrist path.

6. The method of claim 5, wherein step (C) is performed by determining an offset position value that defines an acceptable difference between the desired tool position and the next tool position; and determining a set of tool positions within the range of available tool positions, wherein each position within the set differs from the desired position of the tool by a value that is less than or equal to the offset position value and determining the next tool position from within the set of tool positions.

7. The method of claim 6, wherein step (C) further includes determining a closest tool position from the set of tool positions that requires a minimum amount of movement of the wrist to move the tool from a current tool position to the closest tool position and defining the next tool position as the closest tool position.

8. The method of claim 5, wherein the wrist has three axes that intersect each other and a sphere having the intersection of the three axes as an origin defines a range of available tool positions, the desired tool position is outside of the sphere and wherein step (C) includes determining a set of wrist axis angles that will place the tool into a position within the sphere that corresponds to the desired tool position.

9. The method of claim 8, further comprising preventing movement along one of the wrist axes and determining the position of the tool within the sphere by determining an axis position for each of the other two wrist axes using inverse kinematics.

10. The method of claim 1, further comprising preventing movement along one of the wrist axes.

11. The method of claim 10, wherein step (C) is performed by determining a range of available tool positions dictated by movement along a remainder of the plurality of wrist axes without moving along the one wrist axis and determining the next tool position to be a position that requires a minimum of movement along the remainder of wrist axes from the current tool position to the next tool position.

12. The method of claim 11, wherein the minimum of movement is determined based upon a number of degrees of movement along each axis.

13. The method of claim 1, further comprising performing step (C) to alternately move the tool to one side of the path and then an opposite side of the path after each time that step (D) is performed.

14. A method of controlling movement of a tool that is supported by a robot having a wrist that is moveable about three wrist axes that are each associated with a wrist origin, comprising the steps of:
(A) moving the wrist origin along a predetermined wrist path;
(B) determining a desired tool position;
(C) determining a next tool position from a range of tool positions available by moving only the wrist about the wrist axes with the wrist origin in a current wrist origin position;
(D) determining a position vector between the current wrist origin position and the next tool position;
(E) determining a set of wrist axis positions necessary to move the tool into the next tool position from the determined position vector and the determined next tool position;
(F) moving the tool from a current tool position into the next tool position by moving only the wrist into the determined set of wrist axis positions.

15. The method of claim 14, further comprising the step of (G) repeatedly performing steps (B) through (F) at preselected update intervals while performing step (A).

16. The method of claim 14, wherein step (E) includes fixing a value for one of the wrist axes and determining an inverse kinematic solution for the wrist axis positions of the other two wrist axes, using the position vector and the fixed value.

17. A system for controlling robot movement, comprising:
a robot arm having a plurality of arm axes about which said arm is moveable;
a robot wrist supported on one end of said arm and having a wrist origin and a plurality of wrist axes that provide movement of said wrist relative to said wrist origin;
a tool supported by said wrist;
a wrist actuator for moving said wrist about said wrist axes; and
a controller including
    means for determining a desired tool position;
    means for determining a next tool position from a range of tool positions available by moving only the wrist about the wrist axes with the wrist origin in a current wrist origin position;
    means for determining a position vector between the current wrist origin position and the next tool position;
    means for determining a set of wrist axis positions necessary to move the tool into the next tool position from the determined position vector and the determined next tool position; and
    command means for commanding said wrist actuator to move the tool from a current tool position into the next tool position by moving only the wrist into the determined set of wrist axis positions.

18. The system of claim 17, wherein each of said determining means comprises software within said controller.

19. The system of claim 17, wherein there are three wrist axes and wherein said controller controls said wrist actuator to move said wrist about only two of said three axes to thereby move said tool without moving said wrist axis.

20. The method of claim 1, wherein the wrist axes are perpendicular to each other and intersecting at the origin.

21. The method of claim 1, wherein there are three perpendicular wrist axes intersecting at the origin.

22. A method of controlling movement of a tool that is supported by a robot having a wrist that is moveable about a plurality of wrist axes that are associated with a wrist origin, comprising the steps of:
(A) positioning the tool adjacent a preselected tool path;
(B) moving the wrist origin along a predetermined wrist path corresponding to the preselected tool path;
(C) moving the tool in a first direction away from the preselected tool path by moving only the wrist about at least one of the wrist axes by determining a desired tool position that is spaced from the preselected path, determining a range of available tool positions based upon only moving the wrist about the wrist axes, determining a next tool position, from within the range of available tool positions, that corresponds to the desired tool position, and moving the tool to the next tool position by moving only the wrist while maintaining the wrist origin on the wrist path;
(D) moving the tool in a second direction back toward the preselected tool path by moving only the wrist about at least one of the wrist axes; and
(E) cyclically performing steps (C) and (D) while performing step (B).

23. The method of claim 22, wherein step (C) is performed by
determining an offset position value that defines an acceptable difference between the desired tool position and the next tool position; and
determining a set of tool positions within the range of available tool positions, wherein each position within the set differs from the desired position of the tool by a value that is less than or equal to the offset position value and determining the next tool position from within the set of tool positions.

24. The method of claim 23, wherein step (C) further includes determining a closest tool position from the set of tool positions that requires a minimum amount of movement of the wrist to move the tool from a current tool position to the closest tool position and defining the next tool position as the closest tool position.

25. The method of claim 22, wherein the wrist has three axes that intersect each other and a sphere having the intersection of the three axes as an origin defines a range of available tool positions, the desired tool position is outside of the sphere and wherein step (C) includes determining a set of wrist axis angles that will place the tool into a position within the sphere that corresponds to the desired tool position.

26. The method of claim 25, further comprising preventing movement along one of the wrist axes and determining the position of the tool within the sphere by determining an axis position for each of the other two wrist axes using inverse kinematics.

27. The method of claim 22, including preventing movement along one of the wrist axes.

28. The method of claim 27 wherein step (C) is performed by determining a range of available tool positions dictated by movement along a remainder of the plurality of wrist axes without moving along the one wrist axis and determining the next tool position to be a position that requires a minimum of movement along the remainder of wrist axes from the current tool position to the next tool position.

29. The method of claim 28, wherein the minimum of movement is determined based upon a number of degrees of movement along each axis.

* * * * *